(12) United States Patent
Wörner et al.

(10) Patent No.: US 6,311,577 B1
(45) Date of Patent: Nov. 6, 2001

(54) SELECTION SYSTEM FOR AN AUTOMATIC MOTOR VEHICLE TRANSMISSION

(75) Inventors: Günter Wörner, Kernen; Hartmut Gösele, Neubulach, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/300,525

(22) Filed: Apr. 28, 1999

(30) Foreign Application Priority Data

Apr. 28, 1998 (DE) .............................................. 198 18 866

(51) Int. Cl.[7] .............................. F16H 59/10; F16H 61/22
(52) U.S. Cl. .................................. 74/473.21; 74/473.23; 74/473.33; 74/471 XY
(58) Field of Search ........................... 74/473.21, 473.22, 74/473.23, 471 XY, 473.33; 477/96; 192/220.2, 220.3, 220.4, 220.5, 220.6, 220.7

(56) References Cited

U.S. PATENT DOCUMENTS

| 4,721,004 | 1/1988 | Ward . | |
|---|---|---|---|
| 5,211,271 | * 5/1993 | Osborn et al. | 192/220.3 |
| 5,649,452 | 7/1997 | Osborn et al. . | |
| 5,695,029 | 12/1997 | Yokoyama et al. . | |
| 5,768,944 | * 6/1998 | Imuzuka et al. | 74/473.21 |
| 5,862,899 | * 1/1999 | Dahlstrom | 477/96 |
| 5,996,763 | * 12/1999 | Tsunge | 192/220.3 |
| 6,009,769 | * 1/2000 | Ikegami | 74/473.23 |

FOREIGN PATENT DOCUMENTS

| 41 20 379 | 1/1993 | (DE) . |
| 41 18 519 | 2/1993 | (DE) . |
| 196 41 706 | 3/1998 | (DE) . |
| 3-239868 | 10/1991 | (JP) . |
| 6-117526 | 4/1994 | (JP) . |

* cited by examiner

Primary Examiner—David A. Bucci
Assistant Examiner—William C Joyce
(74) Attorney, Agent, or Firm—Crowell & Moring LLP (57) ABSTRACT

A selection system for an automatic motor vehicle transmission has a manual selector element which is locked or released by an oblique locking surface as a function of operating conditions. The oblique locking surface divides the manual forces of the selector element into a force component directed in the operating direction of the selector element and into a force component directed transversely thereto. Only this transversely directed force component can act upon additional locking surfaces if their surfaces have not yet been disengaged by an actuator arrangement before a manual operating force is exercised on the selector element.

13 Claims, 7 Drawing Sheets

SELECTION SYSTEM FOR AN AUTOMATIC MOTOR VEHICLE TRANSMISSION

CROSS-REFERENCE TO RELATED APPLICATIONS

This application is related to two concurrently filed applications, Ser. No. 09/300,518 and 09/300,524, filed Apr. 28, 1999, respectively, in the name of Gunter Worner et al. for Selection System For An Automatic Motor Vehicle Transmission; based upon German applications 198 18 863.3-14 and 198 18 864.1-14, filed in Germany on Apr. 28, 1998, the subject matter of which is incorporated herein by reference.

BACKGROUND OF THE INVENTION

This application claims the priority of 198 18 866.8-14, filed Apr. 28, 1998, the disclosure of which is expressly incorporated by reference herein.

The present invention relates to a selection system for an automatic motor vehicle transmission, and more particularly, to a selection system comprising a selector lever which, for selecting shifting positions of the motor vehicle transmission, is arranged to be manually adjustable along a defined moving path in a lever transverse direction to multiple positions (P, R, N, D). A first locking body is arranged to be movable about a rotation axis in a moving direction which extends at a right angle with respect to the direction of a movement of the selector lever to be blocked. A locking surface contour has at least a first oblique locking surface which, in the locked position of the selector lever, is situated forwardly of the selector lever in a moving path thereof and extends diagonally with respect to the moving direction of the selector level and the moving direction of the first locking body such that a manual force component on the selector level is divided on the oblique locking surface into a first force component which extends at a right angle to the oblique locking surface and into a second force component which is directed at a right angle with respect to the manual force component. The second force component is directed in the unlocking moving direction of the first locking body, and a second locking body is arranged to be movable relative to the first locking body and is movable by an actuator arrangement as a function of defined operating conditions automatically between a first position which locks the first locking body in a defined position and a second position which does not lock the first locking body.

A selection system is described in DE 41 20 379 A1. There, a rotation axis of a first locking element is arranged parallel to a rotation axis of a selector lever and to the locking surfaces of the locking element point in the direction parallel to the selector lever longitudinal direction. As a result, any point of the locking surfaces is away from the rotation axis of the locking element at a different lever arm length.

The present invention encompasses all types of automatic transmissions, particularly automatic transmissions having a torque converter, fully automatic and partially automatic gear boxes, automatic converter step mechanisms and variable transmissions with infinitely variable transmission ratios with or without gears.

Additional selection systems are known from U.S. Pat. Nos. 4,721,004; 5,649,452; and 5,695,029. DE 196 41 706 C1, shows a selection system which has a swivellably disposed selector lever which can be swivelled in the direction from a parking position P by way of a reversing position R into a neutral position (idling position) N in which the torque transmitting of the vehicle transmission is interrupted, and into at least one forward driving position D. For the N and P positions, locks are provided which act as a function of certain operating conditions.

In the parking position P, a locking of the known selector lever is required as long as the vehicle brake is not operated and the ignition key is not situated in the ignition lock (or the ignition is not switched on). As soon as the ignition key is situated in the ignition lock (or the ignition is switched on) and the brake is operated, the selector lever is to be released. In the following description, this function will be called a P-lock.

A lock is also provided for the operation of the known selector lever from the neutral position N into the reversing position R. This lock is to be active as long as the vehicle has not yet fallen below a defined limit speed. In the following description, this function will be called an R-lock. However, an operation of the selector lever from D to N must not be hindered by these locks. These functions are described in DE 196 41 706 C1.

JP 3-239868 A describes an arrangement in which locking devices of the selector lever which are assigned to the parking position P and to the reversing position R can be unlocked by exciting a solenoid. The locking function is generated by spring force. In the event of a current failure in the overall vehicle system, it is therefore not possible to bring the selection system into the parking position P. It is therefore also not possible to park the vehicle in a secured manner because the ignition key can be taken out of the ignition lock only in the P-position of the selector lever. In addition, a selection system is described in JP 6-117526 A in which a selector lever is fixedly connected with a locking gate which is provided with stop cams.

DE-A-41 18 519 describes a selection system for an automatic transmission which has a selector lever which, by swivelling about a swivel axis, can be adjusted in one direction from a neutral position N into a forward position D and beyond it to one or several low-gear shifting positions (1, 2) and in the opposite direction to a reversing gear position R and beyond it to a parking position P. A manual backshifting from a higher-ratio gear to a lower-ratio gear will then be automatically blocked if a critical condition would occur for the vehicle as the result of such a backshifting.

The actuators or control elements, which bring the above-mentioned locking devices into the locking and the unlocking position, are preferably electromagnetic control elements and springs but may also be other elements, such as hydraulically or pneumatically operated elements. It should not be possible to unlock the locks at the selector element by a driver's manual operating force, if the operating conditions which are required for an unlocking do not exist, e.g., a driving authorization is given by the driver; the ignition key is in the ignition lock; the vehicle brake is activated; a vehicle brake lock is not unlocked; and/or the vehicle speed is below or above a defined limit value.

A control element must also be able to unlock the lock if the corresponding operating conditions have been met but the driver exercised a manual operating force on the selector element before these operating conditions had been met. In this case, there is the risk that the mechanical locking elements are compressed so much by the manual operating force on the selector lever that they can no longer be torn apart or separated by a control element, or the control element would have to have a size which is not acceptable with respect to the required space and weight or because of the operating heat generated thereby. A larger electromagnetic control element generates a greater amount of heat.

SUMMARY OF THE INVENTION

An object of the present invention is to provide an improved selection system such that the locking device of the selector lever can also be automatically and securely unlocked if smaller or lower-powered control elements are used, or if a higher manual operating force is exercised on the selector lever before the operating conditions exist which are required for the unlocking of the locking device.

According to the present invention, this object has been achieved by providing that the axis of rotation (Z) of the first locking body is arranged in parallel to the direction of the movement of the selector lever to be blocked, and in that the at least one oblique surface of the first locking body is directed into a direction which crosses the selector lever longitudinal direction.

An advantage of the invention is that the length of the lever arm from the axis of rotation (Z) of the first locking body to its locking contour is approximately equally large for all points of this locking contour. As a result, the same unlocking force by a control element is always required for a certain manual force on the selector lever. As a result, the control element must not have a high control force adapted to a most unfavorable lever arm, and the driver of the vehicle can become accustomed to a shifting behavior which always remains the same, which increases the driving comfort.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

A non-swivellable selector lever which is linearly guided transversely to the longitudinal direction of the lever or a swivellably disposed selector lever corresponding to the embodiments described below can be used as the selector element.

Figure 1:
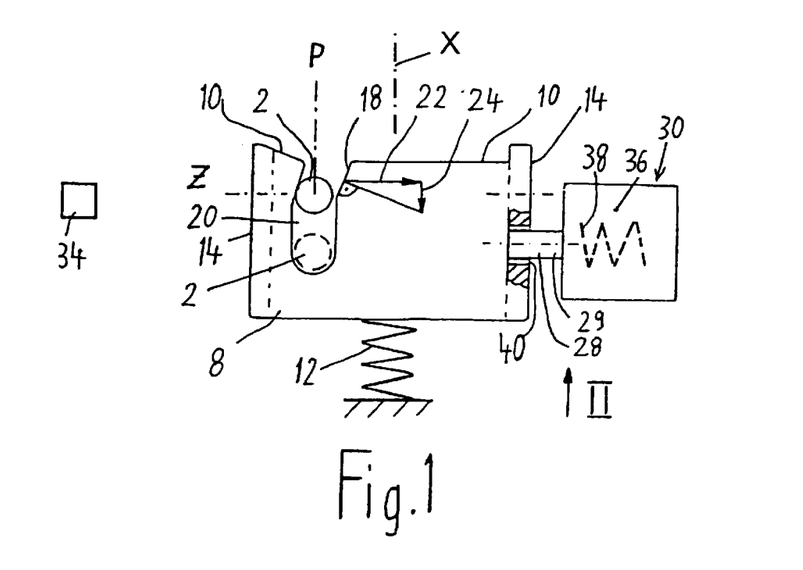
FIG. 1 is a schematic top view of a selection system according to the invention.
Figure 2:
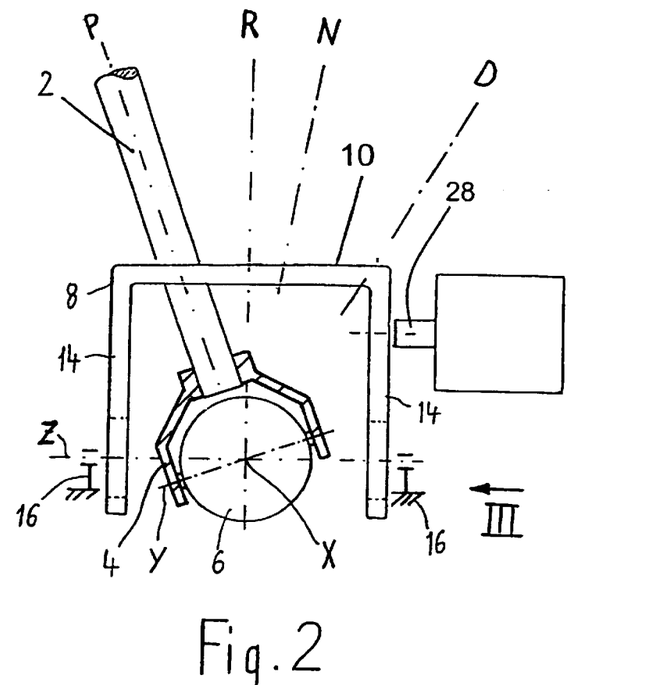
FIG. 2 is a side view of the selection system in the direction of an arrow II of FIG. 1.
Figure 3:
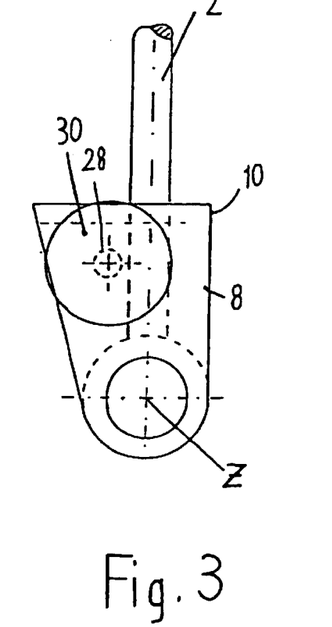
FIG. 3 is a rear view of the selection system in the direction of an arrow III in FIG. 2.

The selection system according to FIGS. 1, 2 and 3 contains a selector lever 2 which is rigidly connected by way of a fork 4 at its lower end with a selector lever shaft 6 in the rotating direction about its rotation axis X and is swivellably connected at a right angle thereto in the longitudinal direction of the selector lever rotation axis X about a transverse rotation axis Y. The two rotation axes X, Y cross one another at a right angle.

In FIG. 2, a first locking body 8 has a U-shape, and an edge 10 of the web portion of the U-shaped body facing the selector lever 2 is constructed along the moving path of the selector lever 2 as a locking surface contour along which the selector lever 2 can be moved. During such a movement of the selector lever 2 along a first locking surface contour 10, elevations and indentations of the locking surface contour 10 press the first locking body 8 against the spring force of a restoring spring 12 more or less far away at a right angle transversely to the selector lever moving direction. The restoring spring 12 is illustrated as a pressure spring; in another type of arrangement, it may also be a tension spring. Of course, several springs can also be used. The first locking body 8 is disposed in stationary bearings 16 so that to be swivellable on its legs 14 about a locking body rotation axis Z which extends in the direction of a movement of the selector lever 2 which is to be locked, which, in the illustrated embodiment, is a movement of the selector lever 2 about the selector lever rotation axis X, to which the locking body rotation axis Z is therefore arranged at a right angle, preferably in a crossing manner.

An oblique locking surface 18 of the locking surface contour 10 is situated at the position of the selector lever 2 to be locked, which may be any possible position of the selector lever 2, and in the illustrated example, is its parking position P. In the parking position P, the selector lever 2 can be moved according to FIG. 1 in a slot 20 formed by the locking surface contour 10 from an end position, which is illustrated by a broken line, about the transverse rotation axis Y into the intermediate position illustrated by broken lines, in which intermediate position it is opposite the oblique locking surface 18. The locking surface 18 extends diagonally to the moving direction in which the selector lever 2 is to be locked, and diagonally to the moving direction in which the first locking body 8 can escape the selector lever 2.

When the selector lever 2 rests against the oblique locking surface 18, a manual force exercised by the driver at the selector lever 2 on the diagonal locking surface in the first locking body 8 is divided into two force components 22, 24. One force component 22 acts in the selector lever moving direction and the other force component 24 acts at a right angle thereto in the moving direction of the first locking body 8, in which it can escape the selector lever. The force component 24 in the locking body moving direction is several times smaller than the force manually generated at the selector lever 2.

Figure 4:
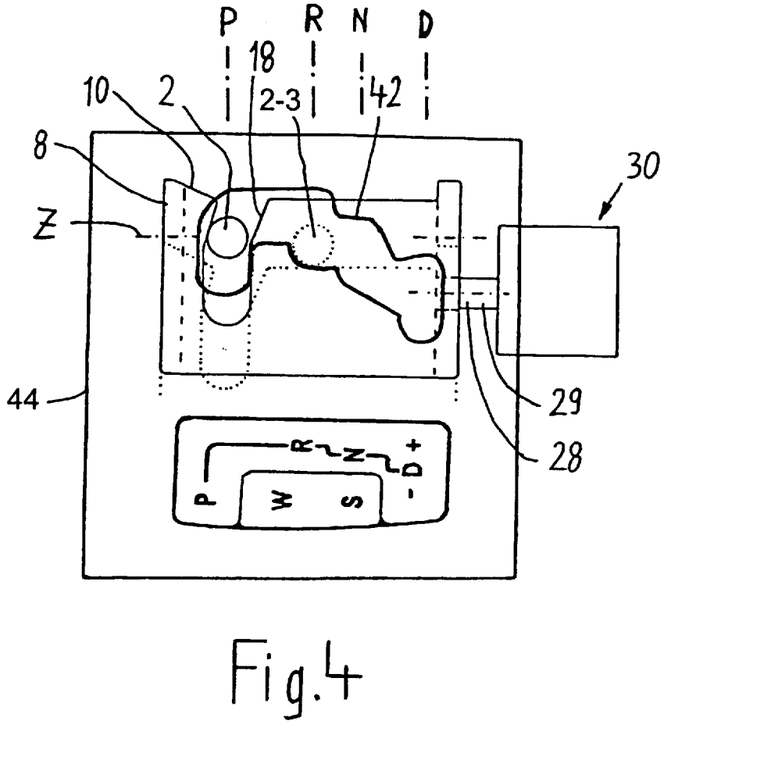
FIG. 4 is a view of the selection system of FIG. 1 illustrated by solid lines in a parking position P and illustrated by dotted lines in a reversing position R of a selector lever, in which a normally opaque cover plate with a guiding gate for the selector lever is shown but for a clearer representation of the invention the normally opaque cover plate is transparent.

The force component 24 in the locking body moving direction causes the locking body 8 to be moved into the position illustrated by a dotted line in FIG. 4. The selector lever 2 can be moved from the parking position P into the reversing position R, which in FIG. 4 is also illustrated by dotted lines and has the reference numeral designation 2–3. When the selector lever 2 is moved back into its parking position R to the slot 20, the locking body 8 is moved by the restoring spring 12 back into its starting position shown in FIG. 1.

On its oblique locking surface 18, the locking body 8 can be pressed by the selector element 2 in the force component indicated by an arrow 24 in the moving direction only if all operating conditions have been met and the locking body 8 is therefore not locked in the locking body moving direction. In the parking position P, such conditions for unlocking the locking body 8 may be that the ignition is switched on or the ignition key is at least situated in the ignition lock and the vehicle brake is in the braking position. As long as such operating conditions have not been met, the movement of the locking body 8 is blocked by a second locking body 28 which, in the locking position, blocks the moving path of the first locking body 8. As a result, only the small force component 24 of a manual operating force exercised at the selector lever 2, which is directed in the moving direction of the first locking body 8, can act upon the second locking body 28.

The force component 24 of the manual operating force will, however, act only upon the second locking body 28 if the driver applies the manual force to the selector lever 2 before all operating conditions for unlocking the first locking body 8 have been met, e.g. the driver forgets to bring the brake into the braking position. If all operating conditions are met before a manual force is applied to the selector lever 2, the second locking body 28 can be moved by an actuator arrangement 30 out of the moving path of the first locking body 8 without being affected by inhibiting forces. As the result of the oblique arrangement of the locking surface 18, the manual force component 24 which can act upon the second locking body 28 is so small that a low force of the actuator arrangement 30 is sufficient for moving the second locking body 28 out of the moving path of the first locking body 8 into an unlocked position.

In the embodiment of FIGS. 1, 2 and 3, the actuator arrangement 30 has a solenoid 36, which is activated by an electronic control unit 34 as a function of the operating conditions, as well as a positioning spring 38. The second locking body 28 may be a cam, a detent or, corresponding to the illustrated embodiment, a portion of an armature 29 which, by way of the positioning spring 38, can be engaged with a locking surface 40 of a second locking surface contour of the first locking body 8, such as a bore, as illustrated in FIG. 1, or can be pulled by the solenoid 36, when it is switched on, against the spring force into the solenoid 36 into an unlocking position. FIG. 2 shows the second locking body 28 in an unlocking position outside the moving path of the first locking body 8.

The moving path of the selector lever 2 is defined by a guiding gate 42 in a cover plate 44, as illustrated in FIG. 4 which shows the cover plate 44 to be made of a transparent material for better illustrating the locking bodies 8, 28 arranged thereunder.

When the selector lever 2 has left the oblique locking surface in the direction from its parking position P to the reversing position R, the solenoid 36 can be switched off again. Only after the selector lever 2 has moved back into the parking position P, will the second locking body 28 or the armature be engaged again with the locking surface 40 of the second locking surface contour of the first locking body 8 by the positioning spring 38.

Figure 5:
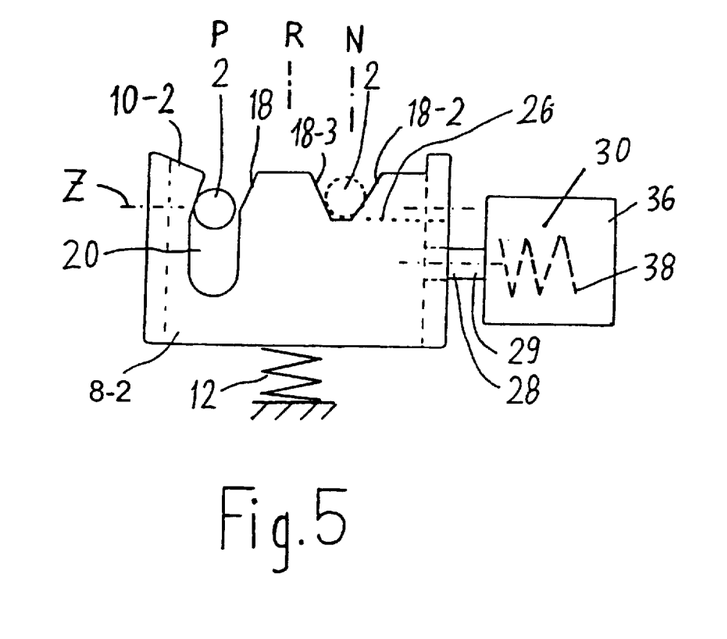
FIG. 5 is a view of another embodiment of a selection system according to the invention with two lockable selector lever positions.

The additional embodiment of a first locking body 8-2 illustrated as a top view in FIG. 5 has, in its locking surface contour 10-2 at the neutral position N, a second oblique surface 18-2 arranged in the same direction as the first locking surface 18 and a third oblique locking surface 18-3 diagonally arranged in an opposite manner. In the neutral position N, the selector lever 2 can be blocked and unblocked on the second oblique locking surface 18-2 in the same manner with respect to moving farther into the forward position D by means of the actuator arrangement 30 as described above with reference to FIG. 1. In this embodiment, the blocking and unblocking can take place as a function of the same and/or different operating conditions, for example, if the engine of the motor vehicle is to be capable of being switched off and on also in the neutral position N, for example, in a car wash facility.

The oppositely oblique third locking surface 18-3 can block the selector lever 2 in the neutral position N from carrying out a reverse movement into the reversing position R if the vehicle speed is higher than zero or higher than a limit value of, for example, 8 km/h. In this case, the positioning spring 38 holds the second locking body 28 in an engagement with the locking surface 40 of the second locking surface contour of the first locking body 8. When the vehicle speed is below the limit value, the solenoid 36 is switched on by the electronic control unit 34 so that it moves the second locking body 28 or its solenoid out of the engagement range of the locking surface 40 of the second locking surface contour. Now the selector lever 2 can be moved by way of the second or third oblique locking surface 8-2 or 8-3 into one of its adjacent positions D or R. When the second locking surface 18-2, and thus the block from N to D, is omitted, the locking surface contour 10-2 will have the course of a dotted line according to FIG. 5.

In a further embodiment according to FIGS. 6 to 9, a first locking body 8-3 has, in a locking gate slot 46, in addition to the first oblique locking surface 18 in the parking position P, a second oblique locking surface 18-4 in the neutral position N of the selector lever 2. The second oblique locking surface 18-4 points into a direction which is opposite to the direction into which an oblique locking surface 18 points. The two oblique locking surfaces 18, 18-4 are formed on mutually opposite edges 10-3, 48 of the locking gate slot 46 at a distance from one another in the longitudinal direction of the slot.

Figure 6:
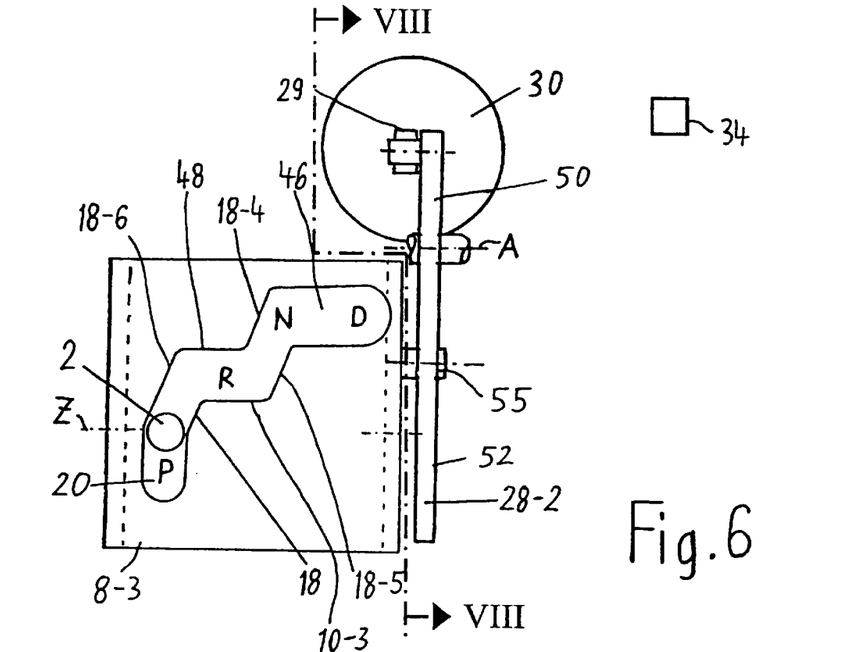
FIG. 6 is a top view of another embodiment of a selection system according to the invention.
Figure 7:
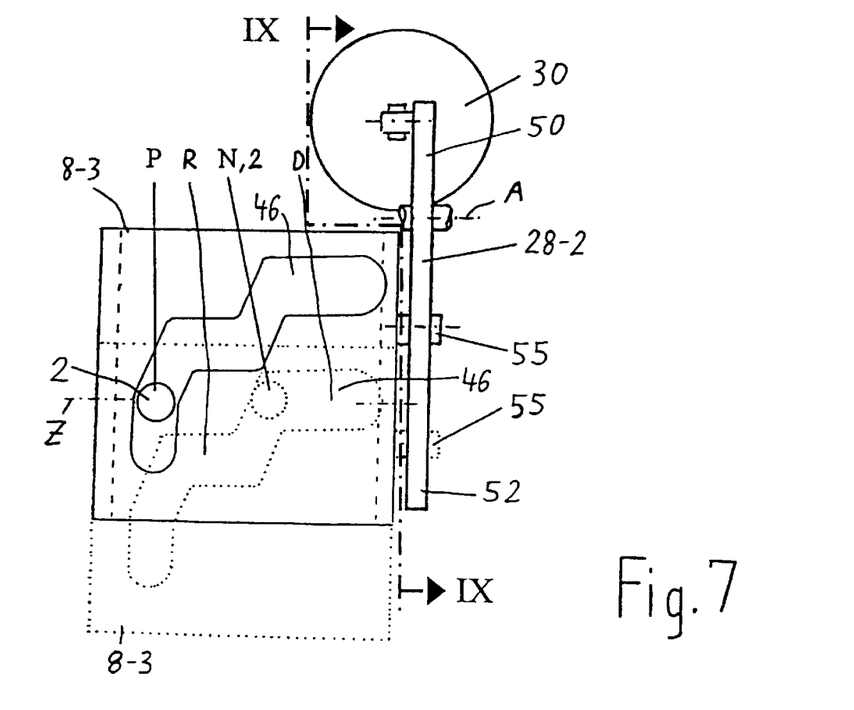
FIG. 7 is a top view of the selection system of FIG. 6 with a parking position P illustrated by solid lines and a neutral position N illustrated by dotted lines of a selector lever and of a locking body.

The solid lines in FIGS. 6 and 7 show the selector lever 2 and the first locking body 8-3 in the parking position P. The dotted lines in FIG. 7 additionally show the selector lever 2 and the first locking body 8-3 in the neutral position N. The reversing position R is situated between the parking position P and the neutral position N. At least one forward position D is situated behind the neutral position N.

When the first locking body 8-3 is unlocked, it can be pressed by the selector lever 2 on the first oblique locking surface 18 away from the position illustrated by solid lines into the position shown by dotted lines and in the process can be swivelled about its rotation axis Z. The selector lever 2 can be moved by a manual force from the parking position P through the reversing position R into the neutral position N illustrated by a dotted line in FIG. 7 and beyond it into the forward position D. The second oblique locking surface 18-4 on the opposite edge 48 blocks the selector lever 2 only and always from carrying out a return movement from the neutral position N into the reversing position R when the first locking body 8-3 is locked. The second oblique locking surface 18-4 of the other gate slot edge 48 is opposed by a third oblique locking surface 18-5 of the one gate slot edge 10-3, on which the selector lever 2 can push the first locking body 8-3 into a locking position in which the selector lever 2 is locked in the neutral position N in the direction to the reversing position R. The third locking surface 18-5 is situated in parallel to the first locking surface 18. On a fourth oblique locking surface 18-5 which is opposite the first oblique locking surface 18, the selector lever 2 can, on the way to the parking position P, move the unlocked first locking body 8-3 about its axis of rotation Z back into its original starting position, which is illustrated by solid lines. No spring force is necessary, but a restoring spring 12 corresponding to FIG. 1 may also be provided in this embodiment.

For locking and unlocking the first locking body 8-3, a second locking body 28-2 is provided in the form of a detent pawl. According to FIGS. 6 to 9, the detent pawl 28-2 is disposed to be swivellable about the rotation axis A which is stationary and parallel to the stationary rotation axis Z of the first locking body 8-3. The detent pawl 28-2 has a lever arm 50, which is operated by the actuator arrangement 30, and an additional lever arm 52, in which a locking gate slot 54 is formed. The detent pawl 28-2 is arranged beside the first locking body 8-3 parallel to its moving path. A stop cam 55, which is fastened to the first locking body 8-3, projects into the gate slot 54 of the detent pawl 28-2.

On mutually opposite edges 56, 57 of the gate slot 54, pawl locking surfaces 58, 60 respectively formed which, in the longitudinal direction of the gate slot 54, are spaced from and point away from one another in opposite directions. One pawl locking surface 58 locks the stop cam 55 and thus also the first locking body 8-3 in the first parking position P of the selector lever 2, as illustrated by solid lines in FIGS. 6, 7 and 8. The other pawl locking surface 60 locks the stop cam 55 and thus the first locking body 8-3 in its position which corresponds to the neutral position N of the selector lever 2 and which is illustrated by solid lines in FIG. 9 and by dotted lines in FIG. 7. The locking position of the detent pawl 28-2 in the neutral position N, which is illustrated in FIG. 9, corresponds to the unlocked position of this detent pawl 28-2 in the parking position P, which is illustrated by dotted lines in FIG. 8.

Figure 8:
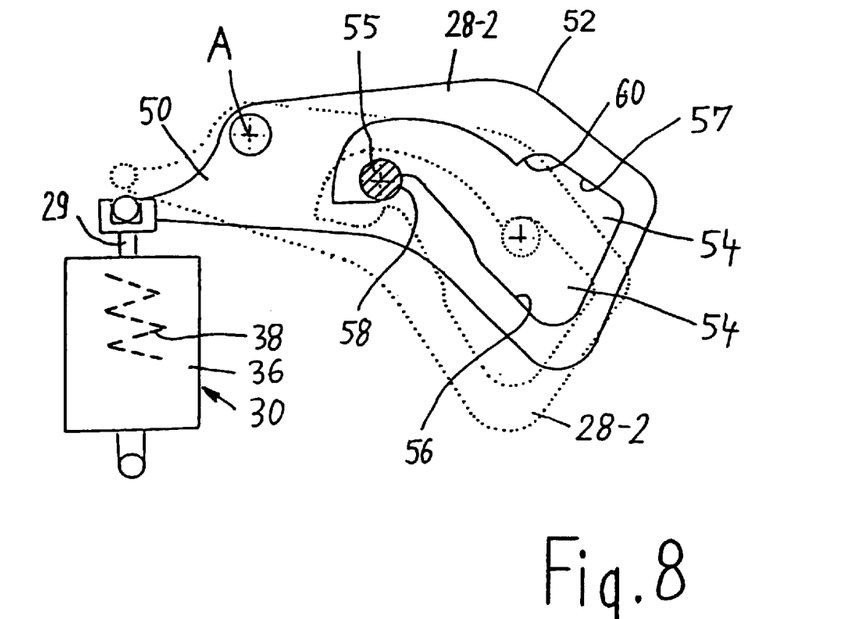
FIG. 8 is a sectional view of the selection system of FIG. 6 in the intersection plane VIII—VIII with a second locking body which is illustrated by solid lines in a locked position and by dotted lines in an unlocked position.
Figure 9:
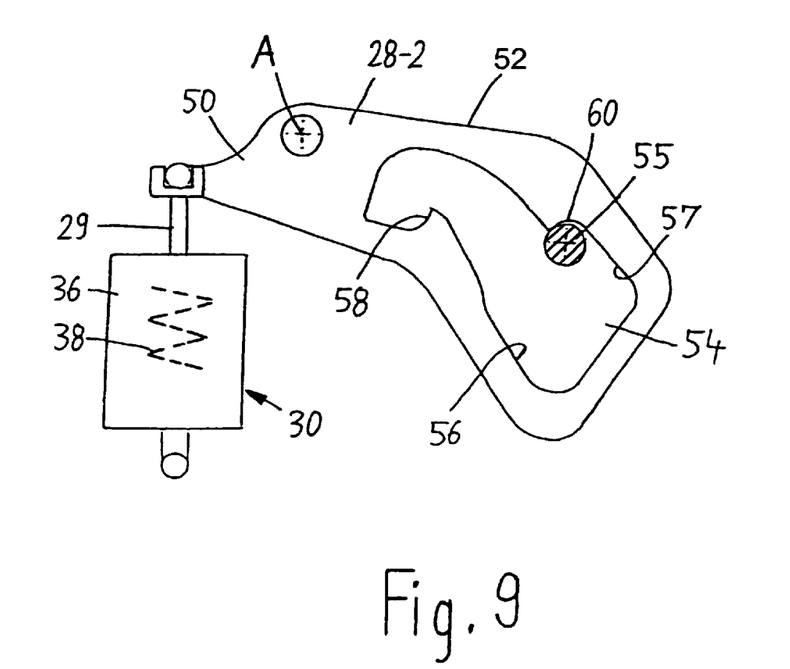
FIG. 9 is a sectional view in the intersection plane IX—IX in FIG. 7 which shows the second locking body in a locked position in which it locks the first locking body in the neutral position N dotted in FIG. 7.

The actuator arrangement 30 contains a positioning spring 38 which, by way of an armature 29 of a solenoid 36, pushes the detent pawl 28-2 with respect to FIGS. 8 and 9 in the counterclockwise rotating direction into the locking position illustrated in FIG. 8 by solid lines, in which it locks the stop cam 56 and thus the first locking body 8-3 when the selector lever 2 is in the parking position P. When all operating conditions for starting the vehicle are met, for example, the ignition is switched on and the brake is in the braking position, the electronic control unit 34 will supply the solenoid 36 with current and thereby switch it on. As a result, the solenoid 36 presses its armature 29 out into an advanced position and thereby swivels the detent pawl 28-2 in the clockwise rotating direction into the unlocking position which is illustrated by dotted lines in FIG. 8 and which also corresponds to the detent pawl position illustrated in FIG. 9, in which the stop cam 55 is released by one pawl locking surface 58.

As the result of a manual force, the selector lever 2 can now push away the first locking body 8-3 on its oblique locking surface 18 and can be moved from the parking position P into the reversing position R and farther into its other positions N and D. At a point between the parking position P and the reversing position R. where a locking with the locking surface 58 is no longer possible, the solenoid 36 is automatically switched off again by the control unit 34. Now the stop cam 55 can be moved freely in the gate slot 54 outside the range of the one pawl locking surface 58. If, however, in the neutral position N and preferably already in the forward position D of the selector element 2, the driving speed of the vehicle is faster than a defined speed limit value, the control unit 34 automatically switches the solenoid 36 back on so that it will move the detent pawl 28-2 in the clockwise direction into the locking position illustrated in FIG. 9, in which the other pawl locking surface 60 will block the stop cam 55 from a reverse movement and thus the selector lever 2 from a reverse movement from the neutral position N into the reversing position R. The unlocking position of the detent pawl 28-2 for its one pawl locking surface 58 is therefore the locking position of this same detent pawl 28-2 for its other pawl locking surface 60.

When the vehicle speed falls below the limit value, the solenoid 36 is automatically switched off again so that then the positioning spring 38 swivels the detent pawl 28-2 again in the counterclockwise rotating direction back into the position illustrated by solid lines in FIG. 1, in which the other pawl locking surface 60 releases the stop cam 55. Thus, the selector lever 2 can be freely moved again in both longitudinal directions in the gate slot 54. When it reaches the parking position P, the stop cam 55 is blocked on the one pawl locking surface 58 until the operating conditions exist again for a reversing or forward driving, thus particularly when the ignition is switched on and the vehicle brake is in the braking position.

The lock of the selector lever 2 in the parking position P is called a P-lock. The lock in the neutral position N is called an R-lock because, as a function of the operating conditions, an adjustment of the selector lever 2 is blocked in the direction from the neutral position N into the reversing position R.

In the above-described embodiments, the selector lever 2 is blocked in a moving direction which extends in the vehicle longitudinal direction. The present invention can, however, also be used for blocking the selector lever in a moving direction which extends transversely thereto. This possibility will be described in the following with reference to the further embodiment illustrated in FIGS. 10, 11 and 12.

Figure 10:
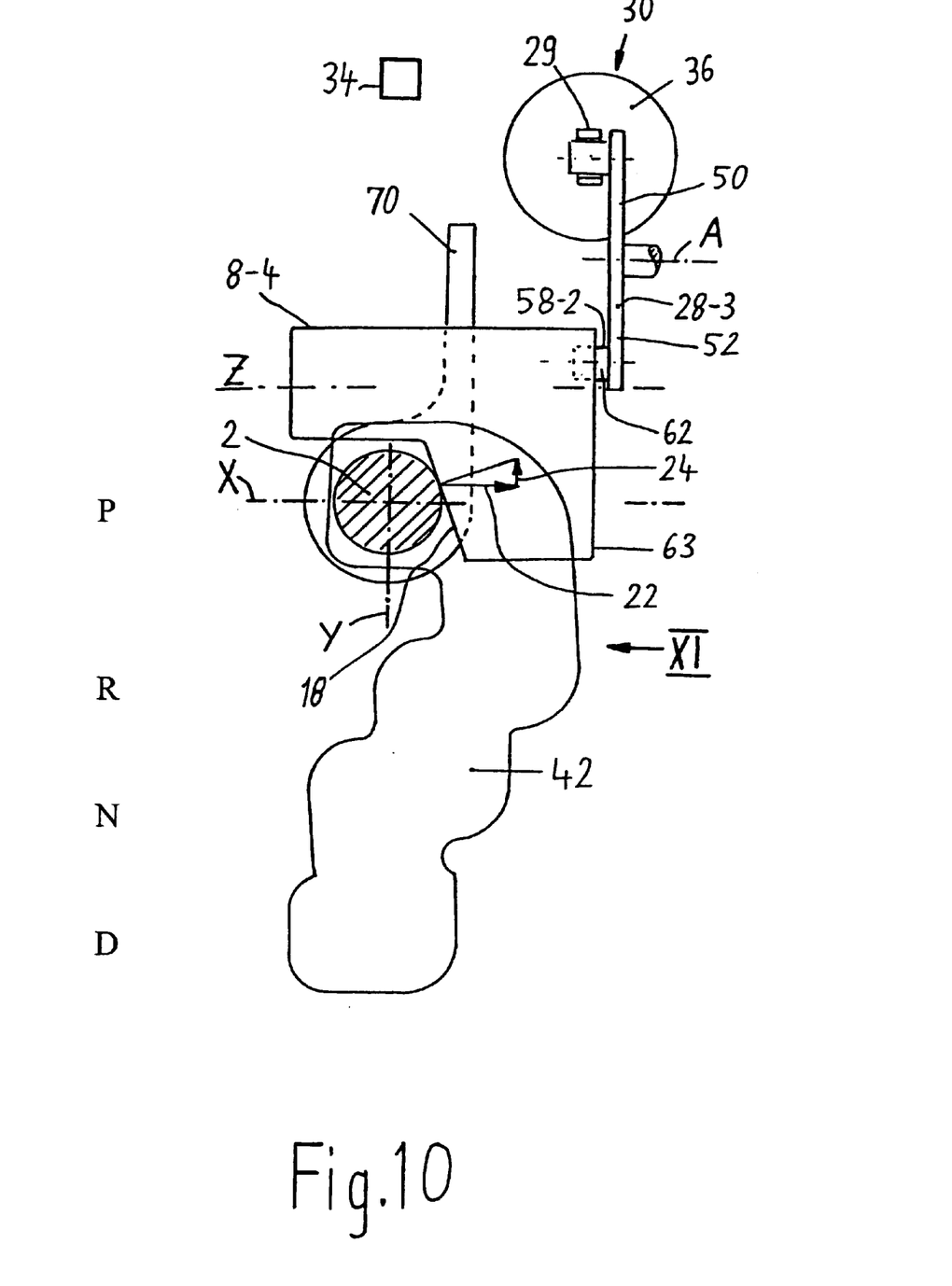
FIG. 10 is a top view of another embodiment of a selection system according to the invention for the operation-dependent locking of a transverse movement of a selector element which is arranged to be movable in the transverse direction of the vehicle and in the longitudinal direction of the vehicle.

The selector lever 2 can be swivelled in the guiding gate 42 about a selector lever rotation axis X in the vehicle longitudinal direction and about a transverse rotation axis Y, which extends transversely thereto by 90°, into the vehicle transverse direction; i.e., among other situations, in the parking position P, from an end position illustrated in FIG. 10, from the left to the right, before it can then be swivelled from this parking position P in the longitudinal direction of the vehicle, and partially also again in the transverse direction, to the other positions R, N and D.

A first locking body 8-4 is disposed to be rotatable about a rotation axis Z which is parallel to the selector lever rotation axis X, and has an oblique locking surface 18 which is situated in the moving path of the selector lever 2 and blocks its path from the end position of the parking position P. The oblique locking surface 18 extends diagonally to the transverse moving direction of the selector lever 2 and diagonally to the moving direction of the locking body 8-4. As a result, a manual transverse force on the selector lever 2 on the diagonal locking surface 16 is divided into a force component 22 in this transverse direction and into a small force component 24. The latter moves the locking body 8-4 in the direction of this force component 24 away from the selector lever 2 into an unlocking position releasing the selector lever 2, when the first locking body 8-4 is not locked by the second locking body 28-3.

Figure 11:
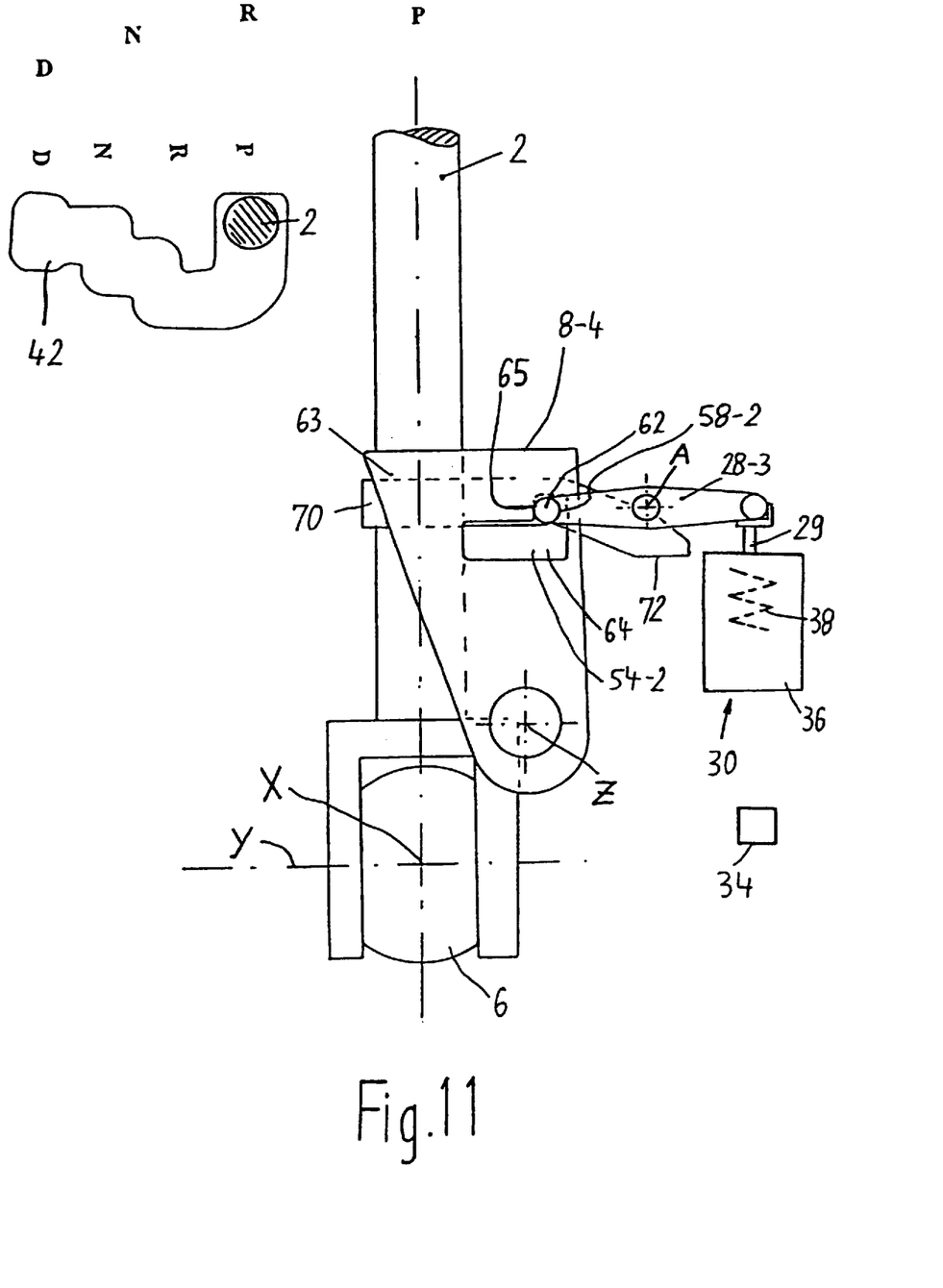
FIG. 11 is a side view of the selection system in the locked position in the direction of an arrow XI in FIG. 10.
Figure 12:
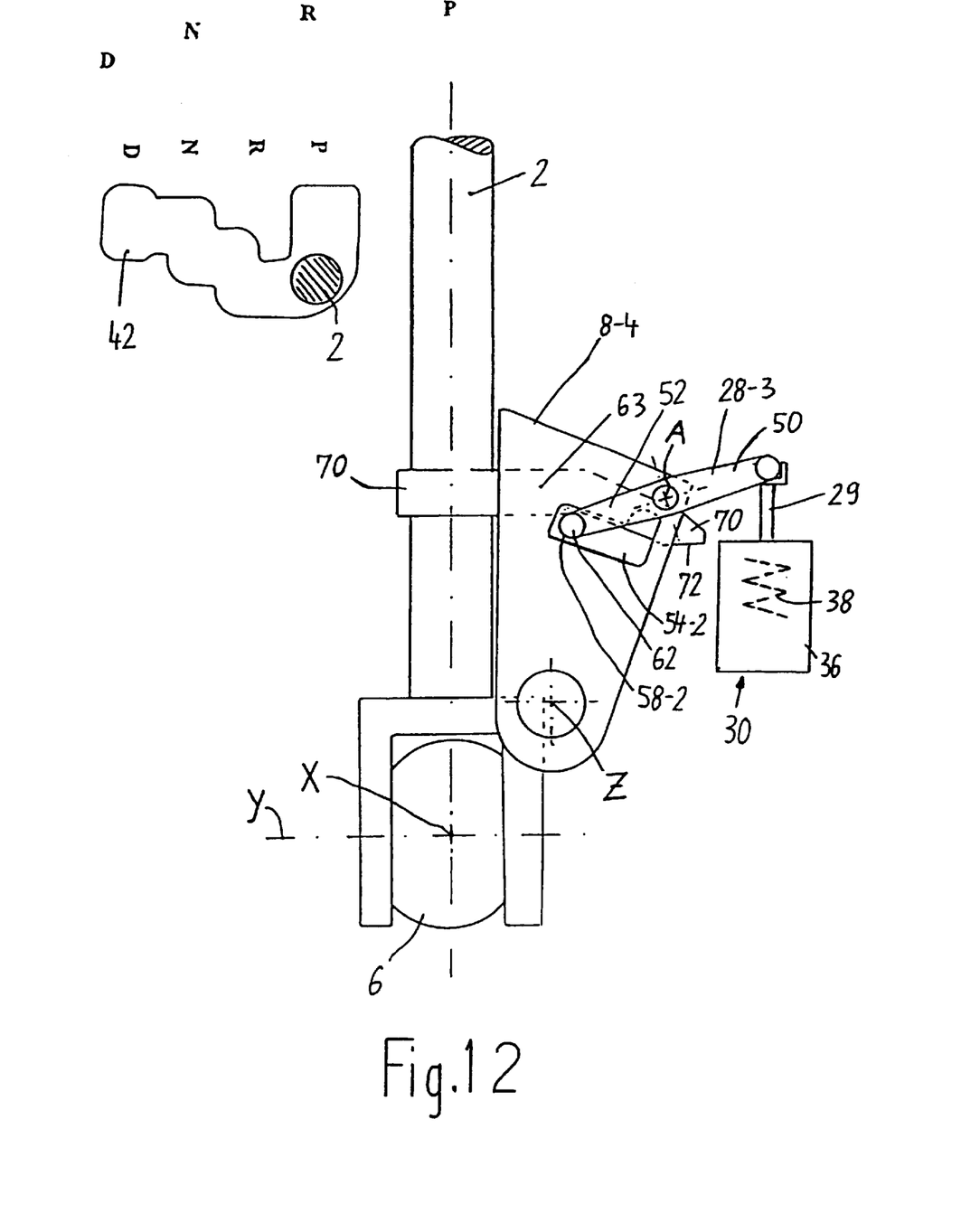
FIG. 12 is the same side view of the selection system as in FIG. 11 but in the unlocked position.

The second locking body 28-3 may be a detent pawl like the detent pawl 28-2 with the one pawl locking surface 58 of FIGS. 8 and 9 or a construction as illustrated in FIGS. 10, 11 and 12. The second locking body 28-3 illustrated there is a double-armed detent pawl which can be rotated about a rotation axis A which is arranged parallel to the selector lever rotation axis X and therefore at a right angle with respect to the transverse rotation axis Y. It is therefore also arranged parallel to the rotation axis Z of the first locking body 8-4.

The detent pawl 28-3 has a lever arm 50, which is operated by the actuator arrangement 30, and another lever arm 52, which, on its free end, carries a cam 62, preferably a freely rotatable roller. The outer-circumference surface of the stop cam 62 is formed by a pawl locking surface 58-2 which engages in an L-shaped locking gate slot 54-2 which is formed in a side wall 63 of the first locking body 8-4 extending transversely to the locking gate rotation axis Z. The locking gate slot 54-2 has a leg 64 which extends tangentially to the circumferential direction of the rotation axis Z, and, at its end facing the detent pawl 28-3, and upwardly extending leg 65. The armature 29 and the positioning spring 38 of the actuator arrangement 30 hold the stop cam 62 in the upwardly extending slotted leg 65 and therefore the first locking body 8-4 in the locked position. FIGS. 10 and 11 show the selector lever 2 in the guiding gate 42 in the end position of its parking position P.

When the operating conditions required for starting the vehicles are met, for example, the ignition key is in the ignition lock, and the brake is in the braking position, the solenoid 36 is automatically switched on by the electronic control unit 34, so that it swivels the stop cam 62 out of the vertical leg 65 into the horizontal leg 64 of the locking gate slot 54-2. The first locking body 8-4 is therefore unlocked and can be pressed away by the selector lever 2 by a manual force out of the transverse moving path of the selector lever 2, when the selector lever 2 is manually loaded in the transverse direction about its transverse rotation axis Y. As a result, the shifting condition is reached which is illustrated in FIG. 12, from which the selector lever 2 can then be moved in the longitudinal direction of the vehicle to the reversing position R and beyond it into a neutral position N and a forward position D.

Outside the parking position P, and between the parking position P and the reversing position R of the selector lever 2, the solenoid 36 is automatically switched off again, and the positioning spring 38 moves the armature 29 and the detent pawl 28-3 and therefore also the first locking body 8-4 from the unlocked position in FIG. 12 back into the locked positions of FIGS. 10 and 11. As a result, the first locking body 8-4 blocks the path of the selector lever 2 from the reversing position R back into the parking position P.

So that the solenoid 36 or a restoring spring 12 must not unlock the first locking body 8-4, an unlocking lever 70 is fastened to the selector lever 2. At its tip, this unlocking lever 70 has an unlocking surface 72 which reaches over the stop cam 62 of the detent pawl 28-3 and presses it out of the vertical slotted leg 65 into the horizontal slotted leg 64 of the locking gate slot 54-2 into an unlocked position.

Thereby, the first locking body 8-4 is unlocked and can be pressed, by the selector lever 2 with a manual force, out of the moving path of the selector lever 2, when the selector lever 2 is moved from its reversing position R back into its parking position P illustrated in FIGS. 10 and 11.

The positioning spring 38 may be integrated in the solenoid 36 and be applied to its armature 29 or be arranged outside the solenoid 36 and be applied to the detent pawl 28-3 of FIGS. 10 to 12 or the detent pawl 28-2 of FIGS. 6 to 9. The positioning spring 38 may be a pressure spring or a tension spring, depending on the direction in which it is arranged with respect to the element to be operated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selection system for an automatic motor vehicle transmission, comprising a selector lever which, for selecting shifting positions of the motor vehicle transmission, is arranged to be manually adjustable along a defined moving path in a lever transverse direction to multiple positions (P, R, N, D), a first locking body arranged to be movable about a rotation axis located in a longitudinal motor vehicle direction so that the first locking body is movable in a direction which extends at a right angle with respect to the direction of a movement of the selector lever to be blocked, and having a locking surface contour with at least a first oblique locking surface which, in the locked position of the selector lever, is situated forwardly of the selector lever in a moving path thereof and extends diagonally such with respect to the moving direction of the selector lever and the moving direction of the first locking body that a manual force component on the selector lever is divided on the oblique locking surface into a first force component which extends at a right angle to the oblique locking surface and into a second force component which is directed at a right angle with respect to the manual force component, the second force component being directed in the unlocking moving direction of the first locking body, a second locking body arranged to be movable relative to the first locking body by an actuator arrangement as a function of defined operating conditions automatically between a first position which locks the first locking body in a defined position and a second position which does not lock the first locking body, wherein the rotation axis of the first locking body is arranged parallel to the direction of the movement of the selector lever to be blocked, and the at least one oblique surface of the first locking body is directed into a direction which crosses a longitudinal direction of the selector lever.

2. The selection system according to claim 1, wherein the selector lever is arranged to be rotatable about at least one rotation axis of the selector lever.

3. The selection system according to claim 1, wherein the selector lever is arranged to be swivellable about two mutually rectangular rotation axes respectively, and the moving path of the selector lever to be blocked extends around one of the rectangular axes of rotation.

4. The selection system according to claim 1, wherein the selector lever is configured to extend through a guide slot of a guide plate which determines the moving path thereof.

5. The selection system according to claim 1, wherein, a spring device is operatively arranged to push the first locking body in a direction of the selector lever.

6. The selection system according to claim 1, wherein, engaging surfaces are operatively arranged to allow the selector lever to be moved into a locking position (P, N).

7. The selection system according to claim 1, wherein the actuator arrangement has a positioning spring device arranged to push the second locking body in a defined moving direction into a defined first position, and an electromagnetic control element arranged to push the second locking body against the spring force of the positioning spring device into a defined second position, and at least one of defined first and second positions is a locking position, in which the second locking body is engageable with and locks the first locking body in a defined position (P, N) of the selector lever.

8. The selection system according to claim 7, wherein the second locking body is an end section of an armature of a solenoid.

9. The selection system according to claim 1, wherein the second locking body is a detent pawl with at least one pawl locking surface configured to be swivellable by the actuator arrangement about a rotation axis and, in one rotating position, is in engagement with the first locking body for locking and, in another rotating position, is in a position relative to the first locking body for unlocking.

10. The selection system according to claim 9, wherein the rotation axis of the pawl is arranged parallel to the rotation axis of the first locking body.

11. The selection system according to claim 9, wherein the second locking body is a detent pawl which is disposed to be rotatably about a rotation axis parallel to the rotation axis of the first locking body and which has a locking gate slot in which, on mutually opposite slot length sides, two pawl locking surfaces are constructed which point away from one another in the longitudinal direction of the slot and are arranged to be alternatively engageable on a stop cam of the first locking body projecting into the detent pawl slot, as the result of the actuator arrangement swivelling the detent pawl.

12. The selection system according to claim 1, wherein the second locking body is a two-armed lever, to a first arm of which the actuator arrangement is applied and on the other arm of which locking devices are operatively arranged for engagement with the first locking body.

13. The selection system according to claim 1, wherein the second locking body moving direction is in the longitudinal direction of the motor vehicle.

* * * * *